Sept. 29, 1925. 1,555,572
L. H. HEGEMAN
ANTISKID CHAIN TIGHTENER
Filed April 23, 1925   2 Sheets-Sheet 1
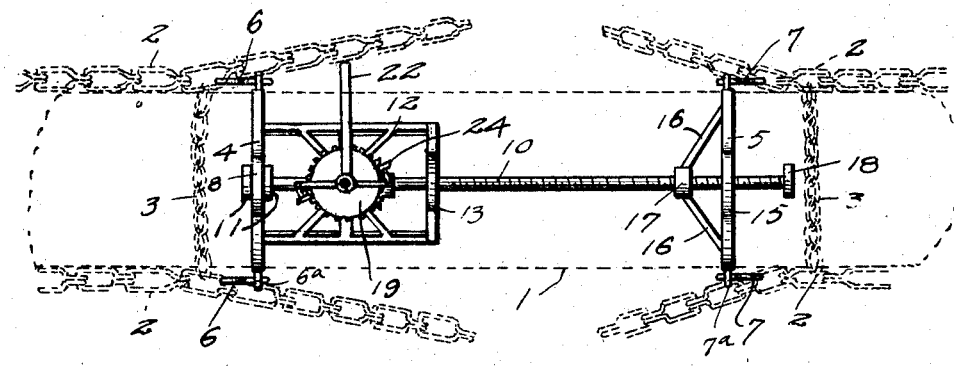
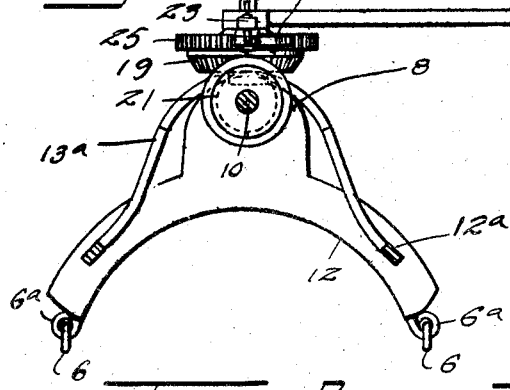
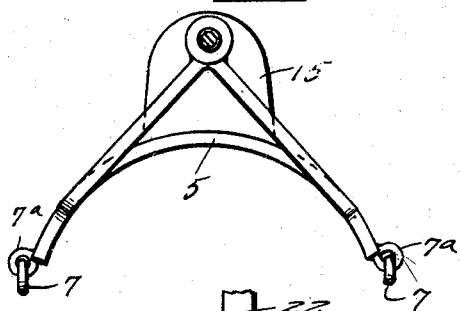
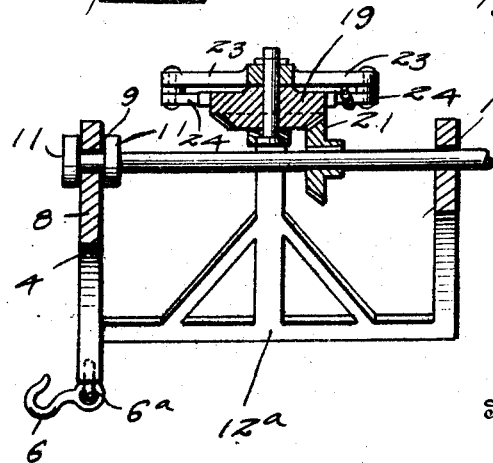
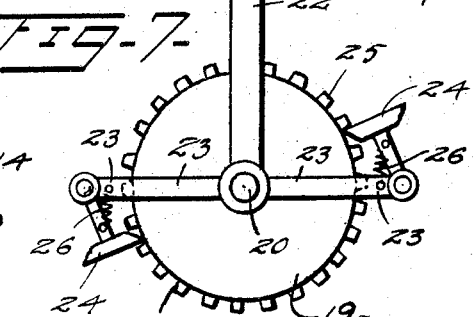
Inventor
L. H. Hegeman,
By
Attorney

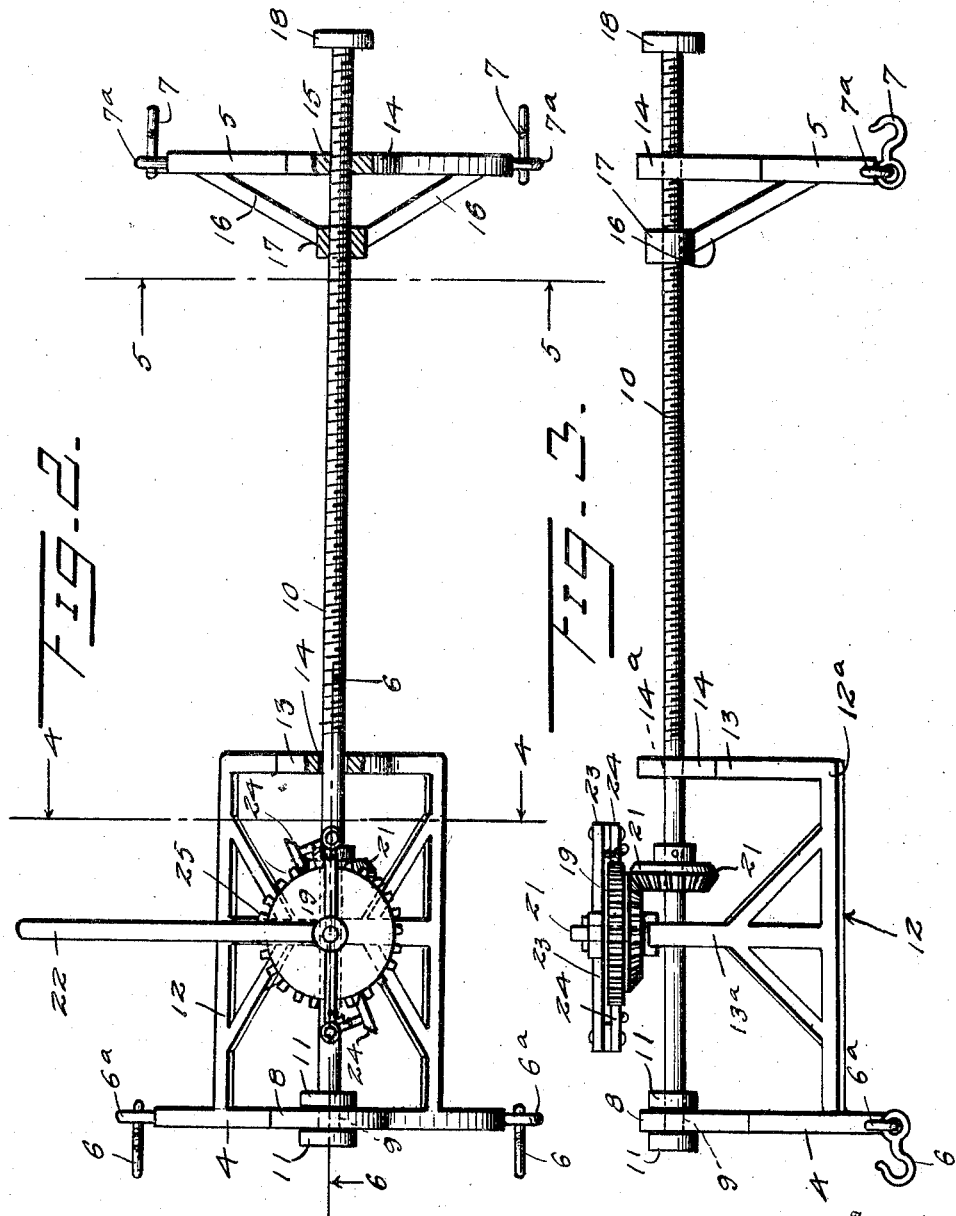

Patented Sept. 29, 1925.

1,555,572

UNITED STATES PATENT OFFICE.

LLOYD H. HEGEMAN, OF ST. JOSEPH, MISSOURI.

ANTISKID-CHAIN TIGHTENER.

Application filed April 23, 1925. Serial No. 25,321.

*To all whom it may concern:*

Be it known that I, LLOYD H. HEGEMAN, a citizen of the United States, residing at St. Joseph, in the county of Buchanan and State of Missouri, have invented certain new and useful Improvements in Antiskid-Chain Tighteners; and I do hereby declare the following to be a full, clear, and exact description of the invention, such as will enable others skilled in the art to which it appertains to make and use the same.

This invention relates to anti-skid chains for automobile wheels, and more particularly to the tools employed during the application of the chains to tighten them about the wheels preparatory to connecting their ends.

The invention has for one of its objects the provision of a tool of the character stated which shall be adapted to be supported in position for use on the tire of the wheel to which the chain is to be applied and which may be operated at the expenditure of comparatively little energy to tighten the chain about the tire and hold it in such condition until the ends thereof are connected.

A further object of the invention is the provision of a tool of the character stated which may be readily positioned upon the tire for use and will not interfere with the operation of connecting the ends of the chain, and which after the ends of the chain have been connected may be readily disconnected from the chain and removed from the tire.

The foregoing and other objects are attained by the construction, combination and arrangement of parts hereinafter fully described and claimed, and illustrated in the accompanying drawings, wherein:

Figure 1 is a view illustrating the manner in which the tool is adapted to be mounted upon a tire and connected to an anti-skid chain therefor, Figure 2 is a detail top plan view of the tool with portions thereof in section, Figure 3 is a detail view in side elevation of the tool, Figure 4 is a sectional view taken on the plane indicated by the line 4—4 of Figure 2, Figure 5 is a sectional view taken on the plane indicated by the line 5—5 of Figure 2, Figure 6 is a sectional view taken on the plane indicated by the line 6—6 of Figure 2, and Figure 7 is a detail top plan view of a portion of the shaft rotating means.

Corresponding and like parts are referred to in the following description, and designated in the several views of the accompanying drawings by similar reference characters.

In the drawings 1 designates an automobile tire, and 2 the side members and 3 the cross members of an anti-skid chain, these parts being shown merely for the purpose of illustrating the application of the tool.

The tool comprises arcuate bars 4 and 5 which are adapted to be connected to the side members 2 by hooks 6 and 7, respectively, and which are adapted to be drawn together in order to tighten the anti-skid chain about the tire 1 so as to permit the ends of the side members 2 to be readily connected. The hooks 6 are pivotally connected to the ends of the bar 4 as at $6^a$, and the hook 7 to the ends of the bar 5 as at $7^a$. The bar 4 is provided with an outstanding lug 8 having a bearing opening 9 in which one end of a shaft 10 is journaled. Collars 11 secured to the shaft 10 and contacting with the inner and outer sides of the lug 8 prevent the shaft from having any endwise movement with respect to the bar 4. A frame 12 extends from the bar 4 in the direction of the bar 5. All parts of the frame 12 are spaced outwardly from the inner edges of the bars 4 and 5 so as to clear any cross member of the anti-skid chain that may be located between said bars when the device is in position for use, whereby to permit the device to be operated without any interference from a cross member of the anti-skid chain. The frame 12 comprises side members $12^a$, an arcuate end member 13 and an intermediate arcuate member $13^a$. The member 13 is provided with an outstanding lug 14 having a bearing opening $14^a$ for the reception of the shaft 10. The shaft 10 is threaded for a portion of its length and said portion passes through and engages an outstanding lug 15 on the bar 5. Braces 16 connected to the bar 5 and to a collar 17 loose on the shaft 10, prevent this bar from having any tilting movement with respect to the shaft.

As the shaft 10 is rotatably connected to the bar 4 and held against endwise movement with respect thereto, and as it has threaded connection with the bar 5, its rotation in one direction will cause the bars 4 and 5 to approach each other and its rotation in the opposite direction will cause the bars 4 and 5 to move away from each other. To prevent the bar 5 from becoming casually disconnected from the shaft 10, the latter is terminally provided with a collar 18.

The means by which the shaft 10 may be rotated comprises a bevel gear 19 which is mounted on a stub shaft 20 extending outwardly from the intermediate frame member 13$^a$, a bevel pinion 21 fixed to the shaft 10 and meshing with the gear 19, and a lever 22 pivoted at one end to the shaft 20 above the gear 19. At its pivoted end the lever 22 is provided with arms 23 upon which pawls 24 are pivotally mounted for engagement with ratchet teeth 25 carried by the gear 19. The pawls 24 are yieldingly held in engagement with the ratchet teeth 25 by springs 26. The lever 22 extends laterally beyond the frame 12 and tire 1 and due thereto, and as it is mounted above the gear 19, it is in convenient position for use and can be operated from either side of the tire. The pawls 24 engage ratchet teeth at diametrically opposite points of the gear 19, and due thereto the operation of the lever 22 will impart a continuous motion to this gear and through it and the gear 21 to the shaft 10. The movement thus imparted to the shaft 10 will draw the bars 4 and 5 in the direction of each other with the result that the anti-skid chain will be tightened upon the tire 1. After connecting the ends of the side members 2 of the anti-skid chain, the shaft 10 may be rotated in the reverse direction so as to cause the bars 4 and 5 to move away from each other by reversing the position of the pawls 24 upon the arms 23. The movement of the bars 4 and 5 away from each other releases the strain upon the hooks 6 and 7, and thus enables the hooks to be readily disengaged from the side members 2 after the ends of said members are connected.

From the foregoing description, taken in connection with the accompanying drawings, the advantages of the construction and of the method of operation of the tool will be readily apparent to those skilled in the art to which it appertains. While I have described the principle of operation of the tool, together with the structure which I now consider to be the best embodiment thereof, I desire to have it understood that the structure shown is merely illustrative, and that such changes may be made when desired as are within the scope of the invention as claimed.

What is claimed is:—

1. A chain tightener comprising arcuate bars, attaching elements carried by the bars, a frame carried by one of the bars, a shaft having a swivel connection with the bar carrying the frame and having threaded engagement with the other bar, a stub shaft carried by the frame outwardly beyond said first named shaft, a bevel gear journaled on the stub shaft, a bevel gear fixed to the first named shaft, a lever pivoted to the stub shaft outwardly beyond the gear thereon and having ratchet engagement with said gear.

2. A chain tightener comprising arcuate bars, attaching elements carried by the bars, a frame carried by one of the bars and spaced outwardly from the inner edges of both bars, a shaft having a swivel connection with one of the bars and threaded engagement with the other and journaled in said frame, a stub shaft carried by the frame outwardly beyond said first named shaft, a bevel gear journaled on the stub shaft, a bevel gear fixed to the first named shaft, a lever pivoted to the stub shaft outwardly beyond the gear thereon and having ratchet engagement with said gear.

3. A chain tightener comprising arcuate bars, attaching elements carried by the bars, a frame carried by one of the bars and spaced outwardly from the inner edges of both bars, a shaft journaled in the frame and the bar carrying the frame and having threaded engagement with the other bar, means for preventing the shaft from having endwise movement with respect to the bar carrying the frame, and shaft operating means carried by the frame outwardly beyond the shaft.

4. A tool for tightening anti-skid devices having side chains, comprising elongated bars arranged in parallel relation, a shaft having a swivel connection with one of the bars and threaded engagement with the other, shaft rotating means, and means carried by the ends of the bars for engagement with the side chains of the anti-skid device.

5. A tool for tightening anti-skid devices having side chains, comprising bars arranged in parallel relation and having arcuate inner sides, a shaft having a swivel connection with one of the bars and threaded engagement with the other, shaft rotating means, and means carried by the bars for engagement with the side chains of the anti-skid device.

6. A tool for tightening anti-skid chains having anti-skid devices having side chains, comprising bars arranged in parallel relation and having arcuate inner sides, a shaft having a swivel connection with one of the bars and threaded engagement with the other, shaft rotating means, means carried by the bars for engagement with the side chains of the anti-skid device, a collar through which the shaft loosely passes, and braces extending from said collar to said other bar.

In testimony whereof I affix my signature.

LLOYD H. HEGEMAN.